US005368705A

United States Patent [19]

Cassidy

[11] Patent Number: 5,368,705

[45] Date of Patent: * Nov. 29, 1994

[54] FUEL TREATMENT AND CONDITIONING APPARATUS

[75] Inventor: Stephen Cassidy, Attleboro Falls, Mass.

[73] Assignee: Blue Star Technologies, Ltd., Lexington, Mass.

[ * ] Notice: The portion of the term of this patent subsequent to Nov. 2, 2010 has been disclaimed.

[21] Appl. No.: 146,879

[22] Filed: Nov. 1, 1993

Related U.S. Application Data

[63] Continuation-in-part of Ser. No. 815,285, Dec. 27, 1991, Pat. No. 5,258,108.

[51] Int. Cl.[5] ............ C02F 1/46

[52] U.S. Cl. ............ 204/136; 204/148; 204/150; 204/155; 204/248; 204/249; 204/275; 204/293; 210/222; 210/748

[58] Field of Search ............ 204/150, 275, 248, 249, 204/293, 155, 148, 136; 210/222, 748, 136

[56] References Cited

U.S. PATENT DOCUMENTS

| | | | |
|---|---|---|---|
| 3,448,034 | 6/1969 | Craft et al. | 204/197 |
| 3,486,999 | 12/1969 | Craft | 204/197 |
| 4,247,398 | 1/1981 | Mohri | 210/222 |
| 4,304,647 | 12/1981 | Lutz et al. | 204/130 |
| 4,429,665 | 2/1984 | Brown | 123/3 |
| 4,713,159 | 12/1987 | Truitt et al. | 204/197 |
| 4,715,325 | 12/1987 | Walker | 123/1 A |
| 4,959,155 | 9/1990 | Gomez | 210/687 |
| 5,258,108 | 11/1993 | Cassidy | 204/150 |

FOREIGN PATENT DOCUMENTS 1392144 4/1988 U.S.S.R. .

OTHER PUBLICATIONS

"Catalytic Water Conditioning," published in *Water Conditioning and Purification* (Feb. 1987).

E.S.P.I., Aqualizer Sales Literature (Mar. 1991).

CAS, Caribbean Clear Pool Purifier sales literature.

Fre-Flo Water Systems, Inc. sales literature.

Care Free Water Products, Inc. sales literature.

Moltek Environmental, Inc. sales literature no date.

Excerpt from Real Goods, Summer-Fall 1990 no month.

*Primary Examiner*—Kathryn Gorgos

*Assistant Examiner*—Arun S. Phasge

*Attorney, Agent, or Firm*—Cesari and McKenna

[57] ABSTRACT

Apparatus for conditioning of fluids such as fuel compositions. The fluid to be treated is brought into contact with an alloy comprising zinc, manganese, copper, a precious metal and silicon. The alloy may be surrounded by one or more magnets to enhance operation.

14 Claims, 5 Drawing Sheets

FUEL TREATMENT AND CONDITIONING APPARATUS

RELATED APPLICATION

The present application is a continuation-in-part of U.S. Ser. No. 07/815,285, filed on Dec. 27, 1991 now U.S. Pat. No. 5,258,108.

BACKGROUND OF THE INVENTION

A. Field of the Invention

The present invention relates generally to apparatus and methods for treating and conditioning liquids, in particular fuel compositions.

B. Description of the Related Art

The need to preserve adequate supplies of pure, potable water has engendered a number of approaches to water purification. These approaches reflect the increasing environmental stress imposed by modern industrial society, and the difficulty of isolating water sources and reservoirs from the effects of such stress. For example, acid rain produced by smokestack discharge can adversely affect the chemical composition of waters far removed from the site of the actual discharge by altering pH levels and causing dissolution of heavy metals that would otherwise lie dormant.

Current treatment methods frequently involve addition of chemicals such as chlorine gas, bleach, sodium hydroxide, ozone, sodium fluoride or sodium hexametaphosphate. Unfortunately, the net result is often replacement of one set of chemical contaminants with another, less offensive set that the public consumes through drinking and cooking. Furthermore, the efficacy of treatment chemicals is usually limited both by their intrinsic properties and safe concentration levels.

The need for fluid conditioning can arise from concerns other than water potability. For example, many industries employ large quantities of treatment chemicals in an effort to reduce corrosion and fouling of equipment such as boilers, cooling towers, refrigerators and compressors; similar treatment of fuel compositions can enhance combustion efficiency, thereby reducing emissions and increasing the amount of energy released from a given quantity of fuel. The chemicals employed in these processes and their byproducts are ultimately introduced into the environment as effluent or exhaust.

As an alternative to chemical treatment, practitioners in the art have developed certain metal alloys which, when brought into contact with an impure fluid, produce various beneficial effects; see, e.g., U.S. Pat. Nos. 4,429,665 and 4,959,155. The mechanism by which these alloys produce such effects is not clearly understood, rendering their identification largely a matter of experimental effort. Also for this reason, the effect of substituting alloy components or adjusting their ranges cannot readily be predicted from traditional metallurgy concepts, nor can it be assumed that different alloys will provide similar types of conditioning effects.

Alloy-based fluid-conditioning systems can operate catalytically or sacrificially; in the latter case, the alloy core gradually disintegrates into the water to be treated. Although catalytic systems are obviously preferable, it is not generally possible to tell, merely from structural and metallurgical description of an apparatus, whether it retains integrity during operation.

Many of the current alloy-based fluid-conditioning systems contain lead as an alloy constituent. Lead is a highly deleterious environmental contaminant that poses significant health risks. Responsible administrative agencies continue to reduce maximum acceptable lead levels, reflecting widespread concern with even minute lead concentrations in the environment generally and in drinking water particularly. Accordingly, sacrificial systems that contain lead introduce this harmful substance into the very liquid they are intended to treat, resulting in elevation of environmental lead levels either directly, through exposed water, or indirectly, through the combustion of lead-containing fuel. Even non-sacrificial lead-containing systems present the risk of at least some contamination.

DESCRIPTION OF THE INVENTION

A. Objects of the Invention

Accordingly, it is an object of the present invention to provide improved methods and apparatus for conditioning fluids such as water and fuel.

It is another object of the invention to condition fluids without the use of lead.

It is further object of the invention is to provide fluid-conditioning methods and apparatus that operate catalytically.

It is yet another object of the invention to provide fluid-conditioning methods and apparatus that are conveniently installed and employed, and are versatile in operation.

Other objects will, in part, be obvious and will, in part, appear hereinafter. The invention accordingly comprises an article of manufacture possessing the features and properties exemplified in the constructions described herein and the several steps and the relation of one or more of such steps with respect to the others and the apparatus embodying the features of construction, combination of elements and the arrangement of parts which are adapted to effect such steps, all as exemplified in the following detailed description, and the scope of the invention will be indicated in the claims.

B. Brief Summary of the Invention

In accordance with the present invention, fluids are passed over a formed metal alloy (preferably contained within a chamber for continuous-flow treatment) to facilitate conditioning thereof. As used herein, the term "fluids" includes, but is not limited to, water, aqueous solutions and fuel compositions such as gasoline, fuel oil, kerosine and the like.

The conditioning effects produced by the present invention include mitigation of corrosion or other oxidative processes (e.g., in piping systems), reduction of scale in hot-water systems and inhibition of heavy-metal solubility. The present invention also retards growth of bacteria by reducing water hardness, thereby lowering the available nutrient level. Fuels treated in accordance herewith exhibit greater combustion efficiency, leading to the delivery of larger amounts of energy per unit of fuel consumed, as well as reduced emissions. All of these effects are accomplished without the use of lead or the introduction of lead into the treated fluid.

In one aspect of the invention, an important feature is grounding of the exterior surface of the chamber in which the alloy core resides when the invention is used to treat water. Without being bound to any particular theory or mechanism, it is believed that the grounded alloy core operates catalytically by facilitating (i.e., reducing the energy associated with) transfer of electrons from earth ground to water and/or particulate matter suspended therein. During operation this results in a potential difference from ground at the surface of the catalytic core, and a constant flow of current as electrons transferred at the core surface are transported away with the fluid.

In another aspect of the invention, particularly suited to fuel treatment, the core is contained in an ungrounded housing that may be metal or nonmetal. However, the housing is preferably nonmetal and surrounded by one or more magnets, evenly disposed around the perimeter of the housing, which enhance the treatment efficacy of the present invention.

C. Brief Description of the Drawings

The foregoing discussion will be understood more readily from the following detailed description of the invention, when taken in conjunction with the accompanying drawings, in which.

D. Detailed Description of the Invention

Figure 1:
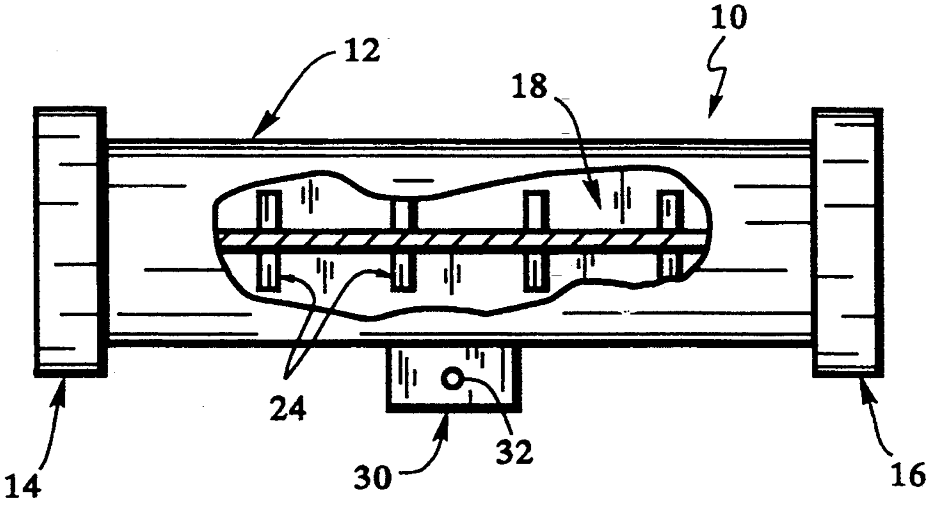
FIG. 1 is a cutaway side view of a device embodying a first version of the present invention.
Figure 2:
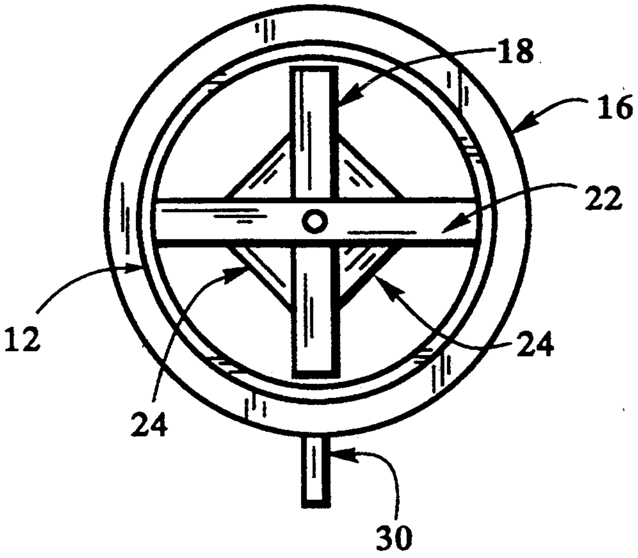
FIG. 2 is an end view of the device depicted in FIG. 1.

Refer first to FIG. 1, which illustrates a representative embodiment of the present invention that is particularly well-suited to water conditioning. As shown therein, a device 10 includes a housing 12 and two ports 14, 16. Housing 12 is constructed from conductive, preferably durable material such as standard metal plumbing material (e.g., steel, stainless steel, copper, brass, bronze or aluminum). Port 14, for convenience designated the input port, receives a fluid stream (generally under pressure) into housing 12. The incoming fluid makes contact with an alloy core 18, which is contained within and secured to housing 12 by means of attachment bars at either end of core 18. One of these bars, denoted by reference numeral 22, is shown in FIG. 2. The attachment bars are preferably conductive, and may be fabricated from material similar to that of housing 12. Treated fluid passes out of housing 12 through port 16, for convenience designated the exit port.

Core 18 is of generally cruciform shape with a series of wedge-shaped fins or baffles 24 evenly spaced along its length. Although this configuration is preferred, its function is to present a high surface area to the incoming fluid and to create turbulent flow within housing 12. Both of these effects improve the action of core 18 on incoming fluid. Accordingly, it is possible to utilize other baffling configurations in lieu of that just described, such alternative designs being well within the purview of those skilled in the art.

Housing 12 is also provided with means for establishing an earth ground. In the embodiment shown in FIG. 1, such means consists of a tab 30 having an aperture 32. During operation of the device, a conductive cable in electrical contact with earth ground is connected to tab 30 via aperture 32. This electrical connection, in combination with conductive housing 12 and the core attachment bars, couples core 18 to the earth ground.

Fluid entering housing 12 interacts with the surface of the grounded core 18, where conditioning takes place. As stated previously, it is believed that such conditioning results from catalytic action involving transfer of electrons from earth ground. Thus, the primary criterion for suitability of a material for core 18 is its ability to produce the conditioning effects that lie at the heart of the invention.

However, it is also important for core 18 to exhibit durability over a reasonable useful life, and resist degradation from the effects of turbulent flow. In addition, while core 18 is preferably formed by casting, the alloy should lend itself to machining or other fabrication processes.

Preferred alloy compositions include a precious metal (e.g., silver, palladium, platinum, gold, rhodium, iridium, ruthenium or osmium) and a mixture of other metals that promote conditioning and/or the other desirable attributes discussed above. In the preferred embodiment, the precious metal is silver, although substitution for a different precious metal will not materially affect performance. Alloys suitable for use in the present invention include the following constituents in the ranges listed:

Silver 0.25–2%
Copper 45–70%
Manganese 18–25%
Zinc 5–30%
Silicon 0–5%
Molybdenum 0–3%
Titanium 0–5%
Tungsten 0–3%

Various modifications to the above formulation are possible. For example, silicon has been found to be an unusual and highly advantageous additive. It appears both to enhance durability and to modulate the electrical characteristics of core 18. However, because silicon is not a metal, it is absent from the active elements of all water-conditioning apparatus of which I am aware. It is possible, within the scope of the present invention, to eliminate silicon entirely or replace it with another semiconductor material, but silicon currently appears optimal with respect to the durability and electrical properties just mentioned.

The role of tungsten is to promote machinability (e.g., to tap core 18 to facilitate attachment thereto of core-attachment bar 22); if this property is found to be unnecessary, tungsten can be eliminated. It should be emphasized that this formulation omits the traditional alloy materials nickel, tin, aluminum and lead, the latter posing significant environmental hazards as discussed above.

Optimal results, in terms of water and fuel conditioning, have been obtained with an alloy having the following constituents:

Zinc 20.24%
Manganese 22.0%
Copper 54.12%
Silver 1.0%
Silicon 2.64%

The apparatus of the present invention is conveniently installed into a variety of one-way or continuous-flow piping systems by providing ports 14, 16 with the necessary threads, unions, couplings or other means of attachment. The diameter of housing 12 and the size of core 18 can obviously be varied to accommodate different flow rates.

During operation, an electrical potential develops between the surface of core 18 and earth ground. Using the alloy set forth above in a suitable grounded pipe, electric potentials as high as 2 volts have been observed betwen the surface of core 18 and ground. This apparatus was also found to reduce corrosion, scale buildup and water hardness.

Figure 3:
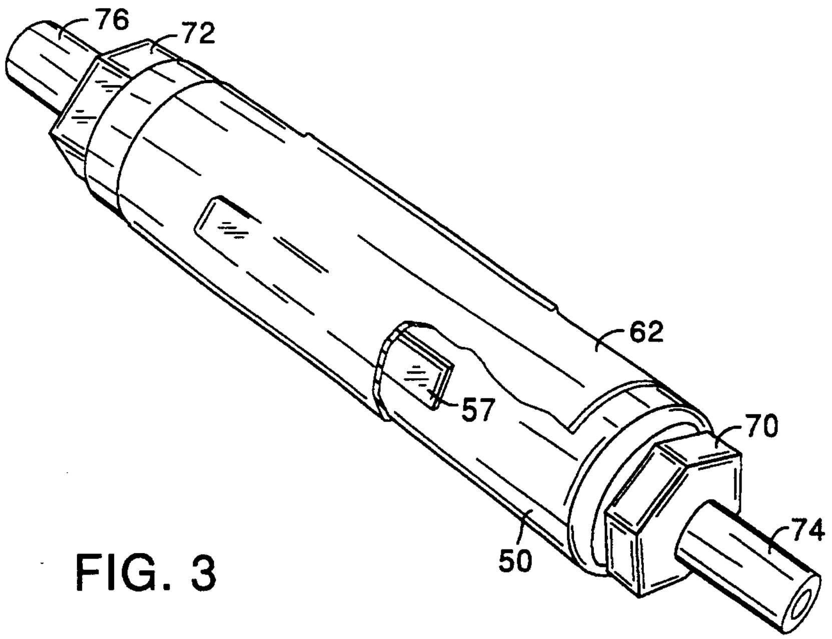
FIG. 3 is a partial-cutaway isometric view of a device embodying a second version of the present invention, adapted especially (although not exclusively) for fuel treatment.

In a second embodiment, illustrated in FIG. 3, the conductive housing has been replaced with a nonconductive version 50, preferably fabricated from a material of relatively low magnetic permeability (i.e., having a permeability significantly lower than that of the metal core, and preferably equivalent to or less than that of air). Representative materials include plastics such as polyethylene, polypropylene and polyvinyl chloride. However, if the invention is to be employed in situ, e.g., under the hood of an automobile, a more heat-resistant material, such as TEFLON, may be appropriate.

Figure 4:
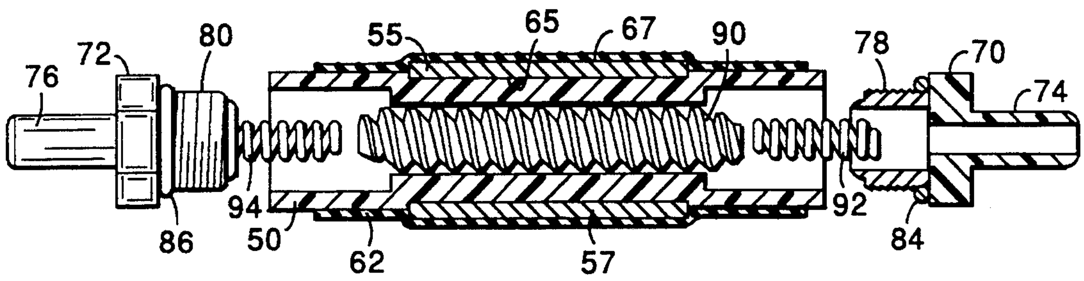
FIG. 4 is a cutaway plan view of the device shown in FIG. 3, and which has been partially rotated.

Surrounding housing 50 and partially embedded therein are a series of three bar magnets 55, 57, 59 (shown most prominently in FIG. 5), which are retained securely by a tightly fitting rubber sleeve 62. The poles of the magnets appear on their faces, such that an entire pole of each magnet is oriented toward the center of housing 50. This is shown in FIG. 4, where the inner face 65 of magnet 55 represents one pole and the outer face 67 represents the opposite pole. The magnets are oriented consistently, such that each presents the same pole toward the center of housing 50.

It is believed that magnets 55, 57, 59 assist in the conditioning process by exerting forces that separate charged particles, effectively driving particles of one charge toward the core while withdrawing particles of opposite charge. This creates a small voltage gradient across the fluid, which may also assist with conditioning. Which magnetic pole is optimally oriented toward the center of housing 50 depends both on the fluid and the contaminants of greatest concern; those skilled in the art can readily determine the optimal orientation and bulk magnetization for a given application. In a representative embodiment, using a housing 50 of approximate length 15 cm, a total magnetization of 500–700 Gauss, with the south magnetic pole oriented inwardly, has been found to perform satisfactorily.

Figure 5:
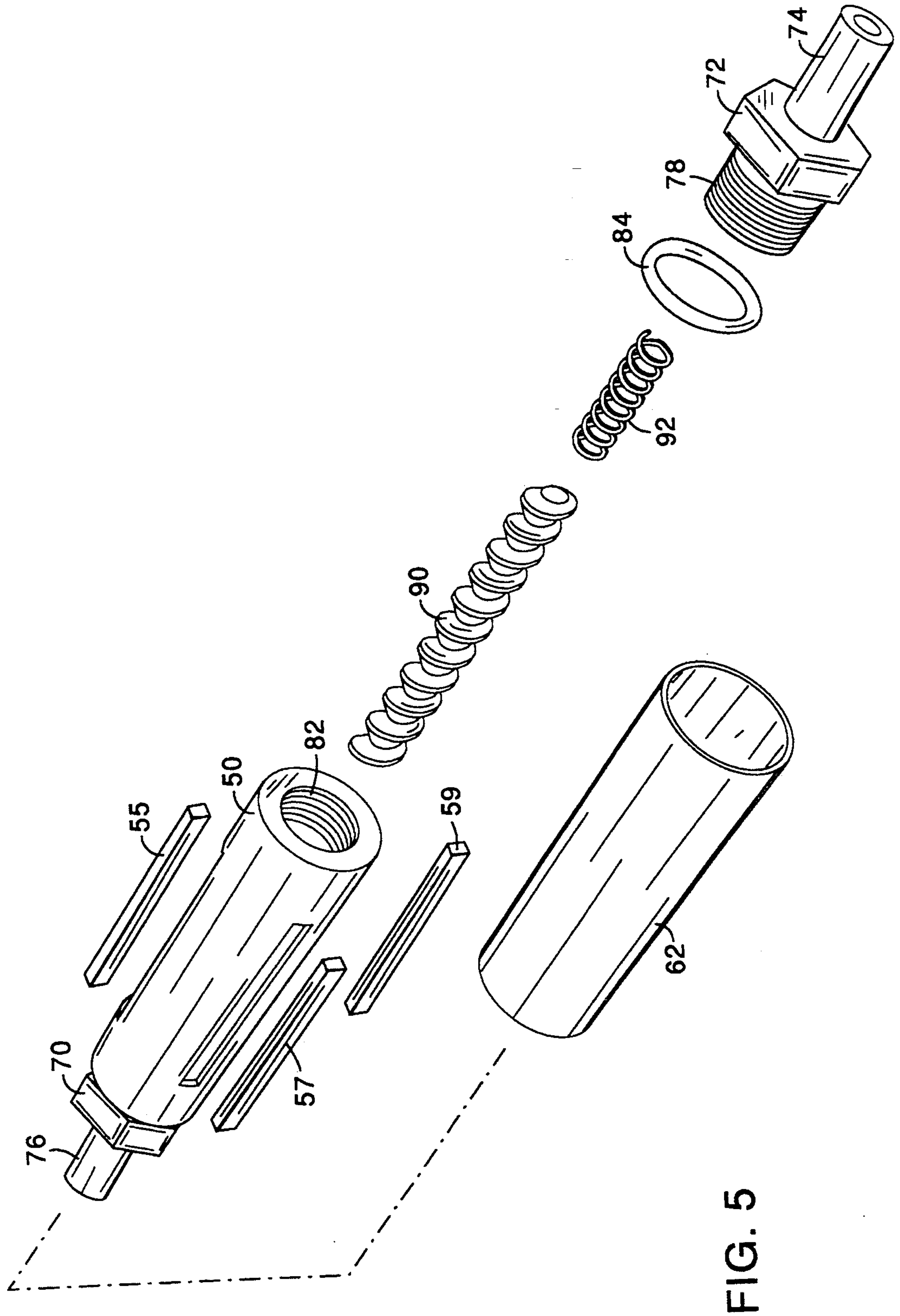
FIG. 5 is an exploded view of the device shown in FIG. 3.

Refer now to FIGS. 3–5, which collectively illustrate the various components and features of the representative embodiment. Housing 50 terminates at each end in a removable cap 70, 72, which admits or discharges fluid through an associated feeder tube 74, 76. Caps 70 and 72 each contain a series of threads 78, 80 that project from the cap and screw onto a set of complementary threads 82 within housing 50, and form seals against the housing by means of associated O-rings 84 and 86.

A core 90 of the alloy described above resides within the bore of body 50. Core 90 is preferably in the form of a helical element, which ensures a high degree of contact between its surface and fluid passing through body 50. A pair of retaining springs 92 and 94 maintain core 90 in a fixed axial position, and prevent it from interfering with transmission of fluid into and out of body 50.

While a helical core design has been found effective in the context of the present invention, numerous alternatives are possible. Some applications may benefit from the design shown in FIGS. 1 and 2, which promotes greater turbulence. Furthermore, since the efficacy of the present invention depends on adequate contact between core 90 and the fluid to be conditioned, a higher core surface area provides a greater degree of contact, and may also decrease the residence time necessary to achieve a given degree of fluid conditioning.

Figure 6A:
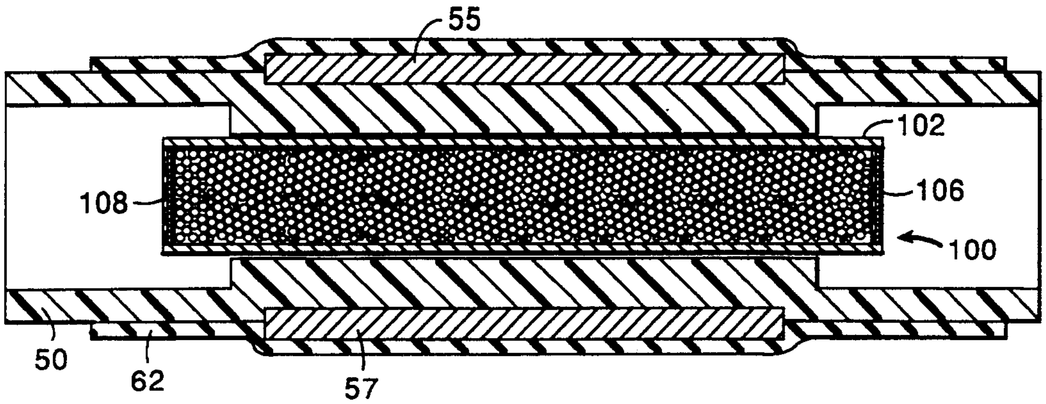
FIGS. 6A and 6B are cutaway plan views illustrating the device shown in FIG. 4 with alternative core constructions.
Figure 6B:
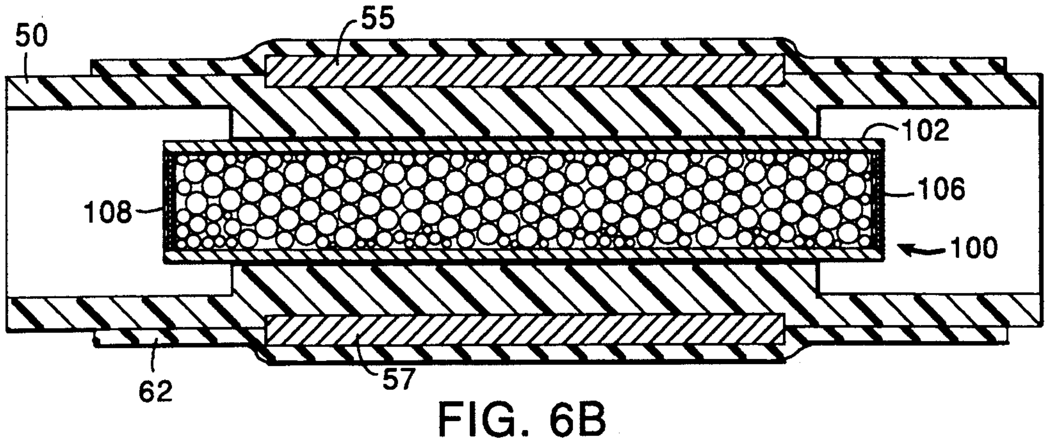

Two core designs having high surface areas are shown in FIGS. 6A and 6B. In each design a core 100 includes a tube 102 whose outer face is sealed against the interior of body 50, thereby forcing fluid to pass through tube 102 before exiting the device. In FIG. 6A, tube 102 contains the core alloy in particulate or even powdered form. The particulates are retained within tube 102 by a pair of screens or filters 106, 108, whose mesh size is smaller than the diameters of the particles.

Although this design provides for a large degree of contact between the alloy and the fluid, the throughput rate is necessarily limited by the density of the core packing and the tight screen required to contain the particles within tube 102. An alternative that accommodates greater fluid throughput rates is illustrated in FIG. 6B. In this embodiment, the particulates have been replaced with larger beads of the core alloy. Although the core presents less effective surface area to the fluid, this design allows the use of screens 106, 108 having a wider mesh, and the greater spacing between beads (as compared with that between particles) permits faster fluid flows.

Figure 6C:
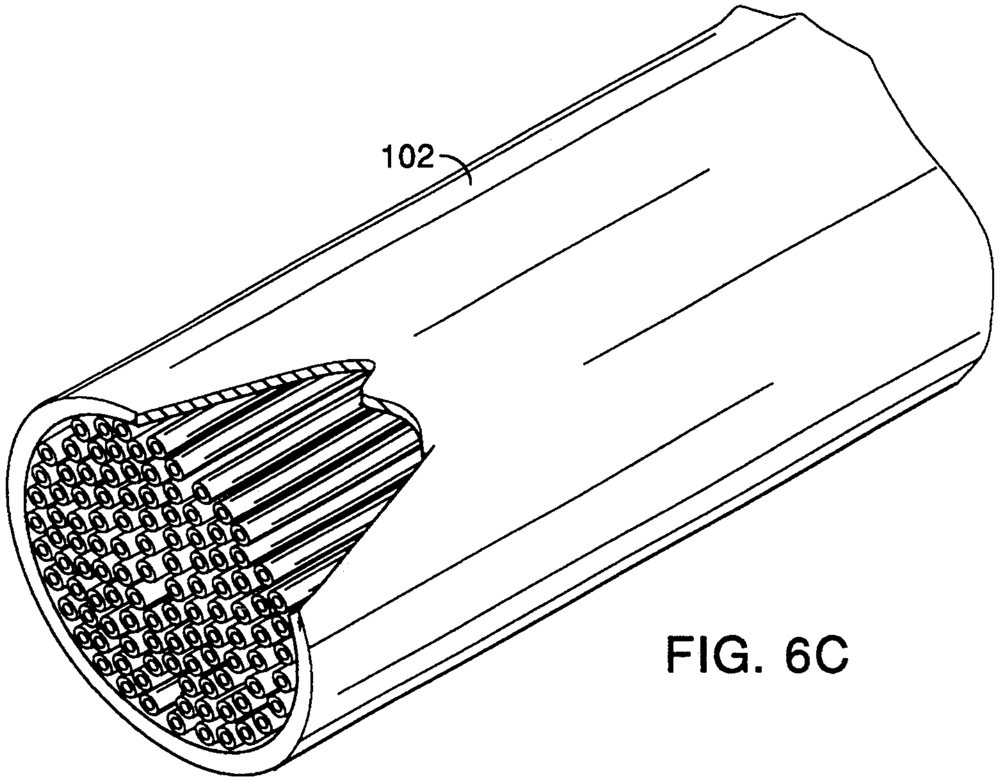
FIGS. 6C and 6D are partial-cutaway isometric views of further alternative core constructions.
Figure 6D:
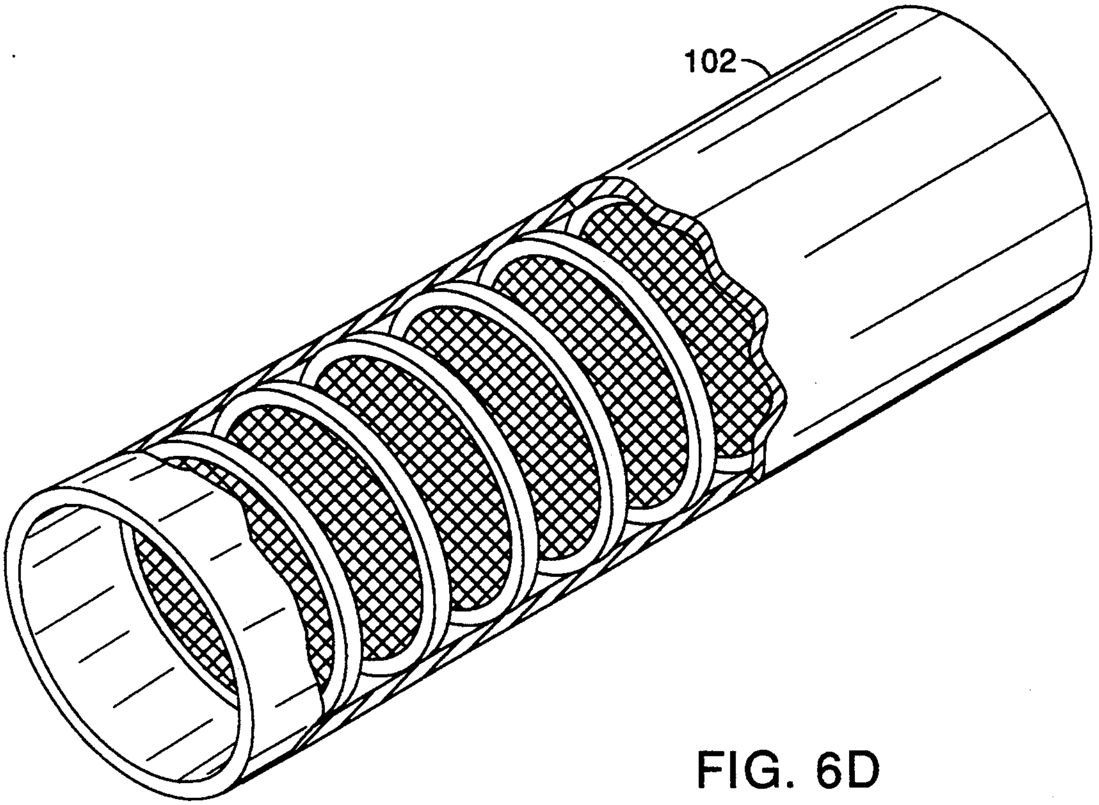

Other alternatives appear in FIGS. 6C and 6D. In the former figure, tube 102 contains a series of hollow channels or conduits of the core alloy and through which fluid is forced to flow. FIG. 6D illustrates an alternative approach, in which the fluid passes through a series of screens whose meshes are formed from the treatment alloy.

It will therefore be seen that we have developed improved fluid-conditioning apparatus that can be utilized with a variety of fluids to address a range of deficiencies. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A fluid-treatment device comprising:

a. a housing including inlet and outlet means;

b. a metal core disposed within the housing so as to contact fluid entering the housing through the inlet means as it passes through the housing, wherein the core is an alloy comprising zinc, manganese, copper, a precious metal and silicon, but not lead, and wherein the device is not supplied with electricity by an outside electrical source.

2. The device of claim 1 wherein the alloy consists essentially of 0.25–2% silver, 45–70% copper, 18–25% manganese, 5–30% zinc and up to 5% silicon.

3. The device of claim 2 wherein the alloy consists essentially of 20.24% zinc, 22.0% manganese, 54.12% copper, 1.0% silver and 2.64% silicon.

4. The device of claim 1 wherein the alloy further comprises at least one metal selected from the group consisting of molybdenum, titanium and tungsten.

5. The device of claim 1 wherein the housing is formed from a material of relatively low magnetic permeability, and further comprising at least one magnet disposed along the housing so as to create a magnetic field in the direction of the core.

6. The device of claim 5 wherein the at least one magnet produces a magnetic field of 500–700 Gauss.

7. The device of claim 1 wherein the housing is formed from plastic.

8. The device of claim 7 wherein the plastic is heat-resistant.

9. The device of claim 1 wherein the core is in the form of a helical body.

10. The device of claim 1 wherein the core is configured to present a relatively high surface area to and cause turbulence within fluid entering through the inlet means and exiting through the outlet means.

11. The device of claim 1 wherein the core comprises at least one screen.

12. The device of claim 1 wherein the core is in the form of a packed powder.

13. The device of claim 1 wherein the core is in the form of beads.

14. The device of claim 1 wherein the core is in the form of a solid body containing a plurality of channels.

* * * * *